United States Patent
Muleshkov et al.

(10) Patent No.: US 11,392,423 B2
(45) Date of Patent: Jul. 19, 2022

(54) METHOD FOR RUNNING A QUORUM-BASED SYSTEM BY DYNAMICALLY MANAGING THE QUORUM

(71) Applicant: VMware, Inc., Palo Alto, CA (US)

(72) Inventors: Georgi Muleshkov, Sofia (BG); Zahari Ivanov, Sofia (BG); Lazarin Lazarov, Sofia (BG); Sergio Sanchez, Sofia (BG)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/713,003

(22) Filed: Dec. 13, 2019

(65) Prior Publication Data

US 2021/0182116 A1 Jun. 17, 2021

(51) Int. Cl.
| | |
|---|---|
| *G06F 15/16* | (2006.01) |
| *G06F 9/50* | (2006.01) |
| *G06F 9/455* | (2018.01) |
| *G06F 9/38* | (2018.01) |

(52) U.S. Cl.
CPC .......... *G06F 9/5077* (2013.01); *G06F 9/3891* (2013.01); *G06F 9/45558* (2013.01); *G06F 2009/45595* (2013.01)

(58) Field of Classification Search
CPC .. G06F 9/5077; G06F 9/45558; G06F 9/3891; G06F 2009/45595
See application file for complete search history.

(56) References Cited

U.S. PATENT DOCUMENTS

| | | | | |
|---|---|---|---|---|
| 5,999,712 | A * | 12/1999 | Moiin | G06F 9/5061 370/254 |
| 6,014,669 | A * | 1/2000 | Slaughter | G06F 16/275 707/684 |
| 6,449,734 | B1 * | 9/2002 | Shrivastava | G06F 11/1662 714/4.11 |
| 7,653,668 | B1 * | 1/2010 | Shelat | G06F 16/184 707/610 |
| 9,723,064 | B1 * | 8/2017 | McKelvie | H04L 67/1095 |
| 10,454,754 | B1 * | 10/2019 | Patel | H04L 69/40 |
| 2003/0014522 | A1 * | 1/2003 | McBrearty | G06F 11/2033 714/E11.073 |
| 2008/0071853 | A1 * | 3/2008 | Mosier | H04L 67/1095 709/201 |
| 2008/0281959 | A1 * | 11/2008 | Robertson | H04L 43/0817 709/224 |
| 2009/0063582 | A1 * | 3/2009 | Anna | H04L 51/00 707/999.203 |

(Continued)

*Primary Examiner* — Hieu T Hoang
(74) *Attorney, Agent, or Firm* — SU IP Consulting (57) ABSTRACT

A quorum in a cluster of nodes in a quorum-based computing system can be dynamically updated such that even just a single remaining operational node can be sufficient to support continued operation of the computing system, while other node(s) in the cluster are in a failure state. When the other node(s) in the cluster become enabled again, the quorum can be adjusted back to an original quorum of the cluster. The content of storage devices in such other node(s) can be deleted when the node(s) start up from the failure state, and up-to-date content from the operational node can be synchronized into the newly started other node(s), thereby enabling content to be consistent and updated in all of the operational nodes in the cluster/quorum.

17 Claims, 5 Drawing Sheets

(56) References Cited

U.S. PATENT DOCUMENTS

| | | | | |
|---|---|---|---|---|
| 2010/0017644 A1* | 1/2010 | Butterworth | ........ | G06F 11/1658 |
| | | | | 714/4.1 |
| 2011/0252270 A1* | 10/2011 | Abraham | ............ | G06F 11/1425 |
| | | | | 714/4.1 |
| 2011/0289344 A1* | 11/2011 | Bae | ..................... | G06F 11/0709 |
| | | | | 714/E11.073 |
| 2013/0191453 A1* | 7/2013 | Nishanov | .............. | G06F 9/5061 |
| | | | | 709/204 |
| 2021/0149902 A1* | 5/2021 | Spezia | .............. | G06F 16/24573 |

\* cited by examiner

METHOD FOR RUNNING A QUORUM-BASED SYSTEM BY DYNAMICALLY MANAGING THE QUORUM

BACKGROUND

Unless otherwise indicated herein, the approaches described in this section are not admitted to be prior art by inclusion in this section.

In a quorum-based computing system, data/operations are replicated across multiple nodes for various reasons, such as for fault-tolerance, data consistency, and high availability. For example, a distributed storage system may include a cluster of storage nodes such that the same piece of data is replicated in each storage node of the cluster. When the data is modified in one of the storage nodes, the modifications should be replicated in the other storage nodes so as to provide consistency in the data throughout the cluster. If a quorum-based algorithm is implemented in the distributed storage system, the modification of the data in one of the storage nodes will first require a quorum (typically a majority of greater than 50%) of the other storage nodes to be available to implement the same modification and to provide permission to perform the modification.

There are some drawbacks associated with a quorum-based computing system. One drawback is due to the nature of a quorum itself—in order for the computing system to operate properly to service read/write requests, perform tasks, etc., there must be a majority quorum of available active nodes in the computing system. For example, if there are three nodes in the quorum-based computing system, then at least two of the nodes need to be available (e.g., a quorum of "2") in order for the computing system to operate properly. If one of the three nodes becomes disabled or otherwise experiences a failure, then the computing system will still operate properly if the other two nodes remain available (due to the quorum of "2" still being met). However, if one of these two remaining nodes then becomes disabled, such that only one of the three nodes remains available, then the computing system will not operate properly (due to the quorum of "2" being unmet).

The computing system will return to normal operation only when one of the two disabled nodes becomes available again, so as to again meet the quorum of "2". The downtime associated with waiting for the computing system to reestablish the quorum can severely affect the efficiency, responsiveness, and performance of the computing system.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. The aspects of the present disclosure, as generally described herein, and illustrated in the drawings, can be arranged, substituted, combined, and designed in a wide variety of different configurations, all of which are explicitly contemplated herein.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

The present disclosure addresses the above-described drawbacks in quorum-based computing systems, by providing a method to dynamically update a quorum in a cluster, such that even just a single remaining operational node can be sufficient to support continued operation of the computing system (e.g., the quorum has been updated to a quorum of "1") while the other node(s) in the cluster are in a failure state. When the other node(s) in the cluster become enabled again (e.g., return from the failure state to an enabled state), the quorum can be adjusted back to an original quorum of the cluster. The content of storage devices in such other node(s) can be deleted when the node(s) start up from the failure state, and up-to-date content from the operational node can be synchronized into the newly started other node(s), thereby enabling content to be consistent and updated in all of the operational nodes in the cluster/quorum.

Computing Environment

The technology described herein to dynamically update a quorum may be implemented in a quorum-based computing system that includes nodes arranged in one or more clusters. In some embodiments, the quorum-based computing system may be implemented in a virtualized computing environment. In other embodiments, the quorum-based computing system may be implemented in a computing environment that does not include virtualization. In still other embodiments, the quorum-based computing system may be implemented in a hybrid environment that has both virtualized and non-virtualized elements.

The nodes in the cluster may include computing nodes and/or storage nodes, whether virtualized or non-virtualized (e.g., physical machines). For instance in some embodiments, the technology described herein may be implemented in a distributed storage system provided in a virtualized computing environment. For instance in other embodiments, the technology may be implemented in a storage system provided in other types of computing environments (which may not necessarily involve a virtualized computing environment), such as a storage system having clusters of physical storage devices that redundantly store data.

For the sake of illustration and explanation, the various embodiments will be described below in the context of a cluster of nodes of a quorum-based computing system that resides in a virtualized computing environment. Virtualization allows the abstraction and pooling of hardware resources to support virtual machines in a virtualized computing environment, such as a software-defined datacenter (SDDC). For example, through server virtualization, virtual machines running different operating systems may be supported by the same physical machine (e.g., referred to as a "host"). Each virtual machine may be generally provisioned with virtual resources to run an operating system and applications. The virtual resources may include central processing unit (CPU) resources, memory resources, storage resources, network resources, etc.

Various implementations will now be explained in more detail using FIG. 1, which is a schematic diagram illustrating an example virtualized computing environment 100 that can implement a method to dynamically manage a quorum. Depending on the desired implementation, virtualized computing environment 100 may include additional and/or alternative components than that shown in FIG. 1.

Figure 1:
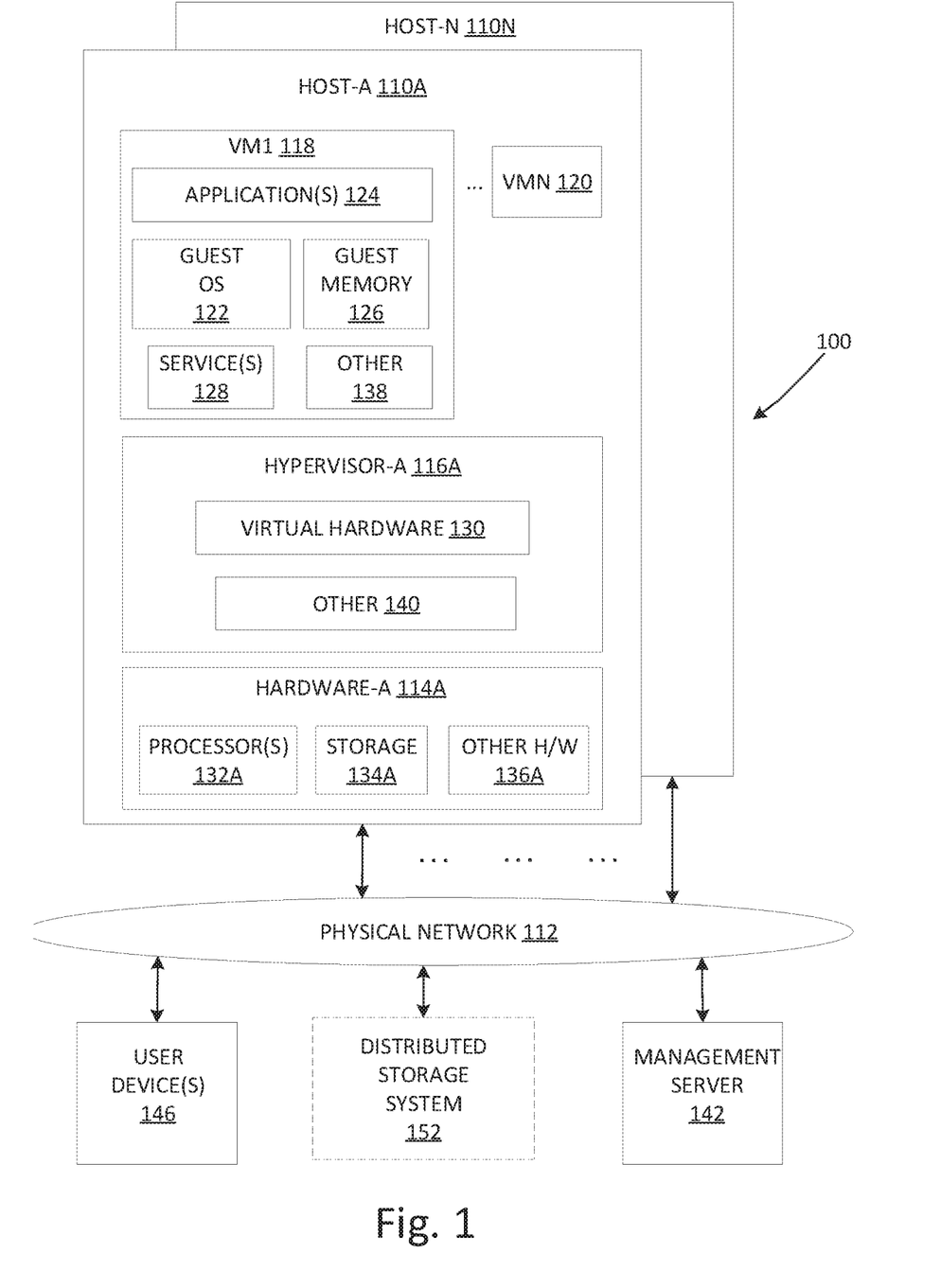
FIG. 1 is a schematic diagram illustrating an example virtualized computing environment that can implement a method to dynamically manage a quorum.

In the example in FIG. 1, the virtualized computing environment 100 includes multiple hosts, such as host-A 110A . . . host-N 110N that may be inter-connected via a physical network 112, such as represented in FIG. 1 by interconnecting arrows between the physical network 112 and host-A 110A . . . host-N 110N. The interconnected hosts may in turn communicate with each other in a unicast or multicast manner. Examples of the physical network 112 can include a wired network, a wireless network, the Internet, or other network types and also combinations of different networks and network types. For simplicity of explanation, the various components and features of the hosts will be described hereinafter in the context of host-A 110A. Each of the other hosts can include substantially similar elements and features.

The host-A 110A includes suitable hardware-A 114A and virtualization software (e.g., hypervisor-A 116A) to support various virtual machines (VMs). For example, the host-A 110A supports VM1 118 . . . VMN 120. In practice, the virtualized computing environment 100 may include any number of hosts (also known as a "computing devices", "host computers", "host devices", "physical servers", "server systems", "physical machines," etc.), wherein each host may be supporting tens or hundreds of virtual machines. For the sake of simplicity, the details of only the single VM1 118 is shown and described herein.

VM1 118 may include a guest operating system (OS) 122 and one or more guest applications 124 (and their corresponding processes) that run on top of the guest operating system 122. VM1 118 may also include a guest memory 126 for use by the guest operating system 122 and/or for other storage purposes. VM1 118 may include one or more elements configured to perform self-updating (of a quorum) in VM1 118, conducting communications between VM1 118 and other VMs to determine their state (e.g., enabled state or failure state), etc. For the sake of illustration and explanation, these element(s) are depicted as one or more services 128 that reside in VM1 118—VM1 118 may use agents, modules, subroutines, or other components or combination thereof (all of which are generically referred to herein as a service) to perform these quorum-management operations, which will be described further below with respect to FIGS. 2-8. VM1 118 may include still further other elements, generally depicted at 138, such as a virtual disk and/or other elements usable in connection with operating VM1 118.

The hypervisor-A 116A may be a software layer or component that supports the execution of multiple virtualized computing instances. The hypervisor-A 116A may run on top of a host operating system (not shown) of the host-A 110A or may run directly on hardware-A 114A. The hypervisor-A 116A maintains a mapping between underlying hardware-A 114A and virtual resources (depicted as virtual hardware 130) allocated to VM1 118 and the other VMs. The hypervisor-A 116A may include still further other elements, generally depicted at 140, such as a virtual switch, agent(s), etc.

Hardware-A 114A in turn includes suitable physical components, such as CPU(s) or processor(s) 132A; storage resources(s) 134A; and other hardware 136A such as memory (e.g., random access memory used by the processors 132A), physical network interface controllers (NICs) to provide network connection, storage controller(s) to access the storage resources(s) 134A, etc. Virtual resources (e.g., the virtual hardware 130) are allocated to each virtual machine to support a guest operating system (OS) and application(s) in the virtual machine, such as the guest OS 122 and the applications 124 in VM1 118. Corresponding to the hardware-A 114A, the virtual hardware 130 may include a virtual CPU, a virtual memory, a virtual disk, a virtual network interface controller (VNIC), etc.

Storage resource(s) 134A may be any suitable physical storage device that is locally housed in or directly attached to host-A 110A, such as hard disk drive (HDD), solid-state drive (SSD), solid-state hybrid drive (SSHD), peripheral component interconnect (PCI) based flash storage, serial advanced technology attachment (SATA) storage, serial attached small computer system interface (SAS) storage, integrated drive electronics (IDE) disks, universal serial bus (USB) storage, etc. The corresponding storage controller may be any suitable controller, such as redundant array of independent disks (RAID) controller (e.g., RAID 1 configuration), etc.

A distributed storage system 152 may be connected to each of the host-A 110A . . . host-N 110N that belong to the same cluster of hosts. For example, the physical network 112 may support physical and logical/virtual connections between the host-A 110A . . . host-N 110N, such that their respective local storage resources (such as the storage resource 134A of the host-A 110A and the corresponding storage resource of each of the other hosts) can be aggregated together to form the distributed storage system 152 that is accessible to and shared by each of the host-A 110A . . . host-N 110N. In this manner, the distributed storage system 152 is shown in broken lines in FIG. 1, so as to symbolically represent that the distributed storage system 152 is formed as a virtual/logical arrangement of the physical storage devices (e.g. the storage resource 134A of host-A 110A) located in the host-A 110A . . . host-N 110N. However, in addition to these storage resources, the distributed storage system 152 may also include stand-alone storage devices that may not necessarily be a part of or located in any particular host.

A management server 142 or other management entity of one embodiment can take the form of a physical computer with functionality to manage or otherwise control the operation of host-A 110A . . . host-N 110N, including operations associated with the distributed storage system 152 and also quorum-management operations in some embodiments. In some embodiments, the functionality of the management server 142 can be implemented in a virtual appliance, for example in the form of a single-purpose VM that may be run on one of the hosts in a cluster or on a host that is not in the cluster of hosts. The management server 142 may be operable to collect usage data associated with the hosts and VMs, to configure and provision VMs, to activate or shut down VMs (thereby triggering quorum updates), to monitor health conditions (including identifying failed nodes in some embodiments, thereby triggering a quorum update), to diagnose and remedy operational issues that pertain to health, and to perform other managerial tasks associated with the operation and use of the various elements in the virtualized computing environment 100 (including managing the operation of the distributed storage system 152).

The management server 142 may be a physical computer that provides a management console and other tools that are directly or remotely accessible to a system administrator or other user. The management server 142 may be communicatively coupled to host-A 110A . . . host-N 110N (and hence communicatively coupled to the virtual machines, hypervisors, hardware, distributed storage system 152, etc.) via the physical network 112. The host-A 110A . . . host-N 110N may in turn be configured as a datacenter that is also managed by the management server 142. In some embodiments, the functionality of the management server 142 may be implemented in any of host-A 110A . . . host-N 110N, instead of being provided as a separate standalone device such as depicted in FIG. 1.

A user may operate a user device 146 to access, via the physical network 112, the functionality of VM1 118 . . . VMN 120 (including operating the applications 124). The user device 146 can be in the form of a computer, including desktop computers and portable computers (such as laptops and smart phones). In one embodiment, the user may be a system administrator that operates the user device 146 to remotely communicate with the management server 142 for purposes of performing operations such as configuring, managing, diagnosing, remediating, etc. for the VMs and hosts (including the distributed storage system 152). The user may also be any general user, such as a consumer that is using the services (e.g., the application 124) provided by VM1 118.

Depending on various implementations, one or more of the physical network 112, the management server 142, and the user device(s) 146 can comprise parts of the virtualized computing environment 100, or one or more of these elements can be external to the virtualized computing environment 100 and configured to be communicatively coupled to the virtualized computing environment 100.

Dynamic Quorum Management

Figure 2:
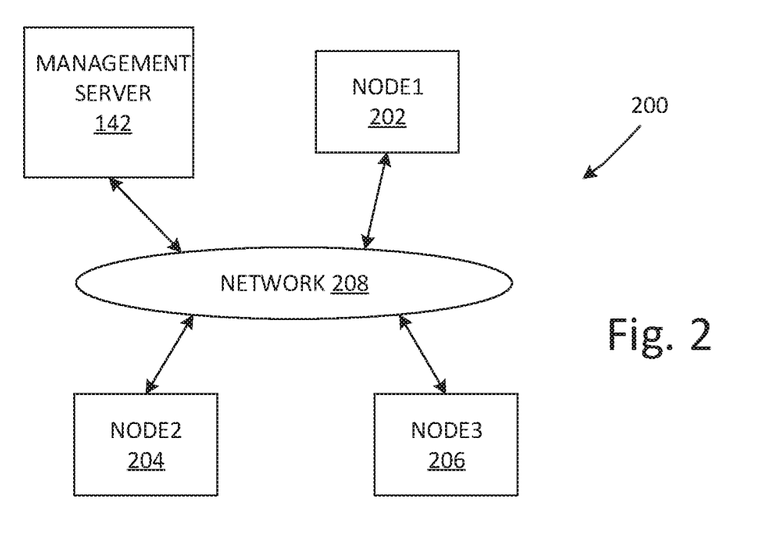
FIG. 2 is a schematic diagram illustrating nodes in a cluster that can be arranged in the virtualized computing environment of FIG. 1.

FIG. 2 is a schematic diagram illustrating nodes in a cluster 200 that can be arranged in the virtualized computing environment 100 of FIG. 1. In this example, there are M=3 nodes (wherein M is an integer number of nodes) in the cluster 200, specifically node1 202, node2 204, and node3 206. The nodes 202-206 may be virtual machines that run on the same host, virtual machines that run on different hosts, physical machines (hosts), servers or routers (physical or virtual), storage devices (physical or virtual), or any other type of physical or virtual computing device (or element/sub-element thereof) or combination thereof.

In one example implementation, the nodes 202-206 in the cluster 200 may be storage nodes in the distributed storage system 152. As previously explained above with respect to FIG. 1, the various storage locations in the distributed storage system 152 may be provided by aggregating the respective physical storage resources of the hosts in FIG. 1. Thus, for example, node1 202 may be a virtual storage node that is formed by aggregating the storage resource 134A (or portion thereof) of host-A 110A and the storage resource (or portion thereof) of some other host(s). The other nodes (e.g., node2 204 and node3 206) may also be virtual storage nodes that are provided by aggregating storage resources (or portions thereof) of the various hosts in the virtualized computing environment 100. Also in other example implementations, some of the nodes 202-206 may be a physical storage node in the form of a stand-alone storage device, rather than being a virtual storage node that is provided by way of an aggregation of storage resources.

The nodes 202-206 may communicate with each other via a network 208. The network 208 may be a physical network (wired or wireless) or a logical network, which are provided/supported through the physical network 112 and/or via other network(s)/connection(s). The management server 142 can communicate with any of the nodes 202-206 via the network 208, in order to perform management operations for the cluster 200. Moreover, the nodes 202-206 can communicate with each other via communication links supported by the network 208.

The cluster 200 of FIG. 2 is part of a quorum-based computing system in that the proper operation of the cluster requires a quorum Q to be met (wherein Q is an integer number of nodes in the cluster 200). Since M=3 nodes in the cluster 200, then the quorum is Q=2 nodes (e.g., a quorum implementation in which Q is determined based on a majority number of nodes in a cluster). Thus under normal circumstances, the cluster 200 as a whole will be operational to perform tasks if at least two of the nodes 202-206 are enabled (e.g., have not been disabled or are not otherwise in a failure state).

Figure 3:
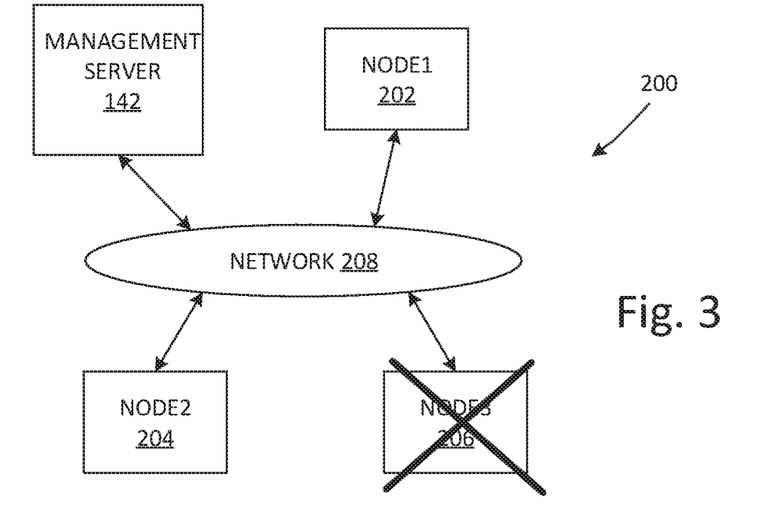
FIG. 3 is a schematic diagram of the cluster of FIG. 2, wherein one of the nodes has become disabled but a quorum is still met.

For example, FIG. 3 is a schematic diagram of the cluster 200 of FIG. 2, wherein one of the nodes has become disabled but the quorum Q=2 is still met. In this example in FIG. 3, node3 206 has become disabled (symbolically depicted by an "X"), while node1 202 and node2 204 remain operational/enabled/active. Thus, the cluster 200 continues to operate as designed in order to perform reading/writing data, executing computational tasks, synchronizing content between the operational nodes, etc.

Figure 4:
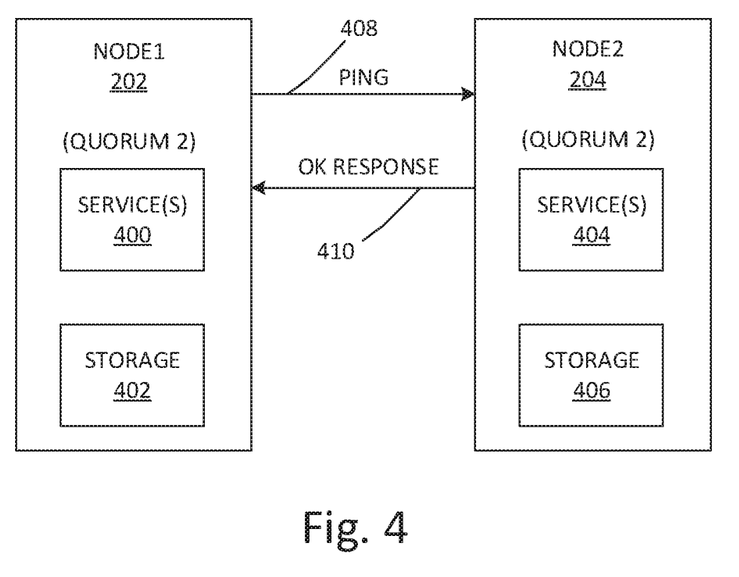
FIG. 4 is a schematic diagram showing further details of two of the nodes in the cluster of FIG. 3 that meet the quorum.

FIG. 4 is a schematic diagram showing further details of two of the nodes (e.g. node1 202 and node2 204) in the cluster 200 of FIG. 3 that meet the quorum Q=2. Node1 202 includes at least one service 400 and a storage device 402. The service(s) 128 and the guest memory 126 of FIG. 1 may be used to respectively implement the at least one service 400 and the storage device 402 of node1 202 in FIG. 4. Similar to node1 202, node2 204 includes at least one service 404 and a storage device 406, and other nodes in the cluster 200 (e.g., node3 206) can include similar elements. For the sake of brevity herein, the other elements that reside in the nodes are not depicted in FIG. 4 and in the other subsequent figures.

According to various embodiments, each of the operational nodes in the cluster 200 is configured to determine the state (e.g., enabled state or failure state) of each of the other nodes in the cluster 200. In one example implementation depicted in FIG. 4, the at least one service 400 of node1 202 is configured to send a ping message (or other type of first communication 408) to node2 204, so as to query the operational state of node2 204. The at least one service 404 of node2 204 can then respond to the communication 408 with an OK message (or other type of second communication 410) sent to the at least one service 400 of node1 202 to indicate that node2 204 is in an operational/active/enabled state (e.g., is not in a failure state). Successful/timely receipt of the communication 410 (with correct/un-distorted information contained therein) indicates to node1 202 that the current/default quorum (Q=2) is still valid, since node2 204 is active and since a sum of the active node1 202 and the node2 204 meets Q=2. In comparison, if the communication 410 is missing, late, distorted, or indicates an error, then such a condition is indicative of a failure state of node2 204, and the quorum can be dynamically adjusted by node1 202 in response to the quorum Q=2 not being met (which will be described later below).

Alternatively or additionally to the communications 408 and 410 shown in FIG. 4, other techniques may be used to enable node1 202 to ascertain the operational status of node2 204. For example, heartbeat messages can be sent by the at least one service 404 of node2 204 to the at least one service 400 of node1 202, without necessarily involving a query from node1 202. Timely heartbeat messages received by node1 202 indicate that node2 204 is not in a failure state, while late or missing heartbeat messages from node2 204 indicate that node2 204 has entered a failure state.

While not specifically depicted in FIG. 4, it is understood that node2 204 may also communicate with node1 202 in order for node2 204 to ascertain the operational status of node1 202. Still further, node1 202 and node2 204 may communicate with node3 206 to determine the operational status of node3 206 (and vice versa). Thus in the examples of FIGS. 3 and 4, one or both of node1 202 and node2 204 has determined that node3 is in a failure state, and has also determined that despite this failure state, the quorum Q=2 is still satisfied so as to enable continued operation of the cluster 200 according to design parameters to perform tasks.

Furthermore, while FIG. 4 depicts an example implementation wherein the nodes communicate directly with each other to ascertain their operational status and to verify the validity of the current quorum Q, some other implementations may use the management server 142 to perform some or all of these operations. For instance, the management server 142 may ping each of the nodes 202-206 in the cluster 200 to determine their operational status. After determining the operational status of each node from their responses (or lack thereof), the management server 142 may then inform the active nodes of the operational status of the other nodes in the cluster 200 so as to enable each of these nodes to validate or self-update the value of Q. In some implementations, the management server 142 itself may validate or update/set Q based on the determined operational status of each node, and then pass the updated value of Q to the active nodes to enable those nodes to operate based on the updated value of Q received from the management server 142.

Figure 5:
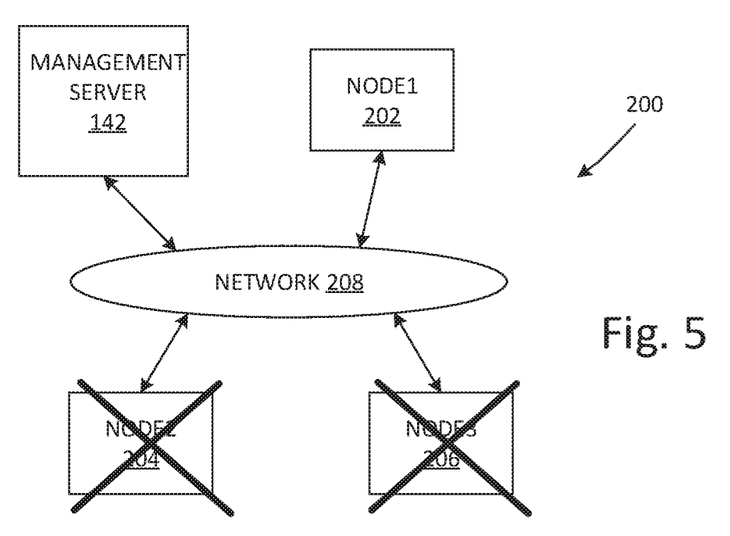
FIG. 5 is a schematic diagram of the cluster of FIG. 2, wherein two of the nodes have become disabled and so the quorum is not met.

FIG. 5 is a schematic diagram of the cluster 200 of FIG. 2 (and FIG. 3), wherein two of the nodes have become disabled and so the quorum (Q=2) is not met. Specifically in the example of FIG. 5, node2 204 has now failed in addition to the failed node3 206 (as depicted by the respective "X" placed on each node). With the capability to provide dynamic updates of the quorum, the various embodiments described herein enable the cluster 200 to continue operating with a number of active nodes that is less than the original quorum Q=2, rather than what would otherwise be the case wherein a cluster would become inoperative when a quorum is not met. That is, for example, the cluster 200 in FIG. 5 can continue to operate with just the single active node1 202.

Figure 6:
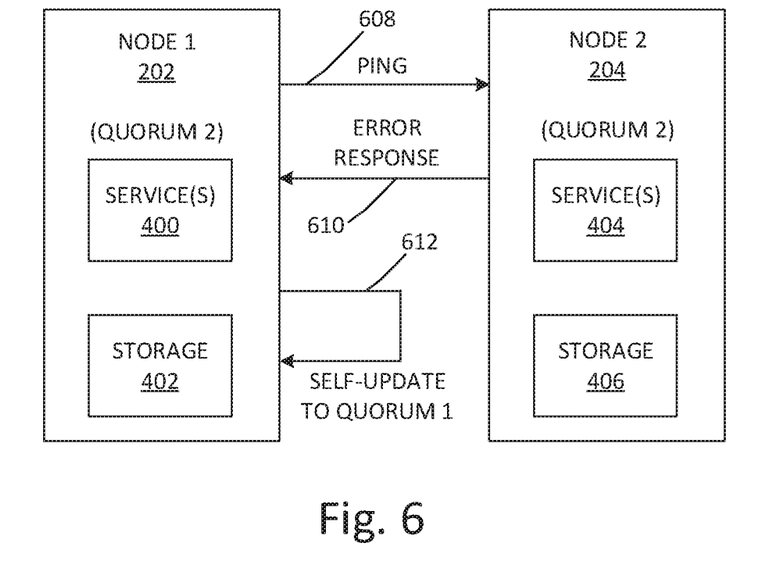
FIG. 6 is a schematic diagram illustrating an update to the quorum for the cluster of FIG. 5.

FIG. 6 is a schematic diagram illustrating an update to the quorum for the cluster 200 of FIG. 5. While the quorum is set at Q=2 for the cluster 200, node1 202 has pinged node2 204 (via a first communication 608) and has received an indication (via a second communication 610) that node2 204 has failed. Now knowing that node2 204 has failed and that the existing quorum Q=2 will be unmet, node1 202 performs a self-update (depicted at 612) to update the quorum from Q=2 to Q=1 for the cluster 200. This dynamic change of the setting for the quorum Q enables node1 202 to continue servicing requests (e.g., read/write requests, etc.) and performing other operations for the cluster 200 while the other nodes in the cluster 200 are disabled. In one embodiment, updating Q from Q=2 to Q=1 includes updating the internal settings/programming of node1 202 such that the components and processes of node1 202 will recognize Q=1 as a condition that is permitted for operation and that Q=2 is not required.

The cluster 200 can continue operating with just active node1 202 (e.g., Q=1) while waiting for other disabled node(s) to come back online. During the course of operating with Q=1, node1 202 can read/write/modify content in its storage device 402, such that the storage device 402 contains the most up-to-date content.

Figure 7:
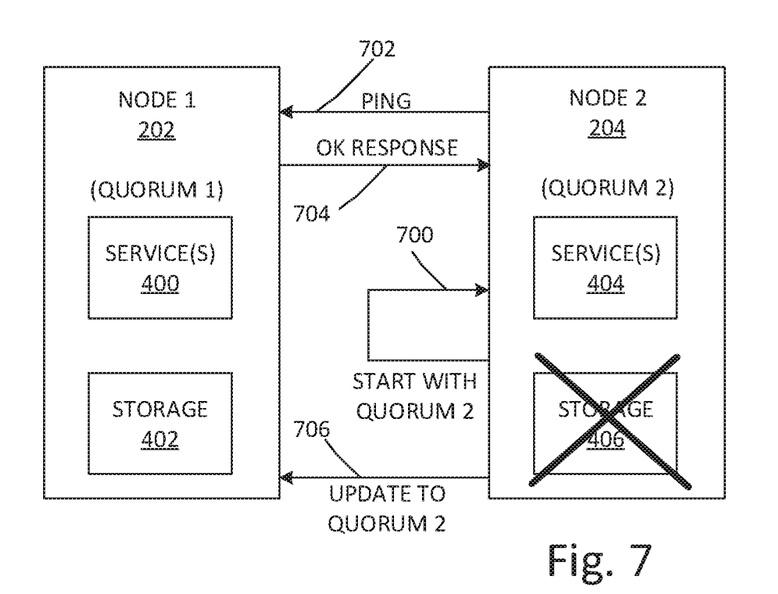
FIG. 7 is a schematic diagram illustrating the reestablishment of the quorum for the nodes in the cluster.

At some point in time, one or more of the other nodes in the cluster 200 will be ready to come back online (e.g., transition from a failure state to an enabled/active state), such that the previous quorum (e.g. Q=2) can be reestablished. FIG. 7 is a schematic diagram illustrating the reestablishment of the quorum for the nodes in the cluster 200. Specifically, FIG. 7 shows the reestablishment of the previous quorum Q=2 for the cluster 200 when node2 204 comes back online. Node3 206 at this point may still be disabled or may be ready to come back online in due course.

When node2 204 is started, node 2 is configured with a quorum setting of Q=2 (depicted at 700). The at least one service 404 of node2 204 then sends a ping message (e.g., a first communication 702) to node1 202 to determine the operational state of node1 202, and node1 202 responds with an OK message (e.g., a second communication 704). From the response from node1 202, the at least one service 404 of node2 204 determines that the quorum setting for node1 202 is presently at Q=1.

Therefore, the at least one service 404 of node2 204 sends a communication 706 to instruct node1 202 to update its quorum setting from Q=1 to Q=2. In response to receiving the communication 706, the at least one service 400 of node1 202 updates the internal settings/programming of node1 202 such that the components and processes of node1 202 will recognize Q=2 as a condition that is needed for operation, rather than the previous Q=1.

Furthermore when node2 204 is started up, the contents of the storage device 406 is deleted (depicted by an "X" in FIG. 7) by the at least one service 404, since such contents have become stale while node2 204 was disabled. Through a synchronization process, the up-to-date contents/data in the storage device 402 of node1 202 is copied into the storage device 406 in node2 204.

Thereafter, the cluster 200 can continue operation as designed, with quorum Q=2 (e.g., both node1 202 and node2 204 being in an enabled state). At some point, the third node3 206 may come back online. Node3 206 can be started with a quorum setting of Q=2, and the other two nodes (e.g., node1 202 and node2 204) need not have their quorum settings updated by node3 206, if both of these two nodes are already operational and already have their quorum setting at Q=2. As with node2 204, node3 206 will have the contents of its storage device deleted and then populated with the up-to-date contents from the other operational node(s).

The examples described above are in the context of the cluster 200 having three nodes (M=3), with a default quorum Q=2. The techniques described above can be extended into implementations wherein the cluster has a greater number of nodes, such as M=5 nodes (or more nodes) with a default quorum of Q=3, for example. Thus, in such example implementation, there may be a node1, node2, node3, node4, and node5 in the cluster.

If node4 and node5 then fail, then the quorum Q=3 is still met and the cluster operates as designed, using the active node1, node2, and node3. If one of these three remaining nodes then fail (for example, node3 fails), then the quorum Q=3 will be unmet.

As a result, the active node1 or node2 can then update the quorum setting for the cluster to Q=2, thereby enabling the cluster to continue operating in a manner similar to FIGS. 2-4 described above. If one of the two remaining nodes (e.g., node1 or node2) subsequently fail, then the quorum Q=2 will be unmet, and a process similar to that described above with respect to FIGS. 5-6 can be executed to update the quorum to Q=1, until such time that the failed nodes are able to be restarted. The quorum can be later updated to Q=2, or Q=3, etc. depending on the number of nodes that are able to be restarted and can join in the quorum.

The various examples above also implement a quorum that is comprised of a majority of nodes in a cluster (e.g., Q=a simple majority number of nodes amongst M nodes). Other values for Q may be implemented in other embodiments. For example, Q may be comprised of a supermajority of nodes. As another example, Q may be a specific number defined by a system administrator, including possibly a number (sum of active nodes) that may amount to less than 50% of M in some implementations where more than 50% of the nodes may not be needed/desired in order to support the performance of tasks in the cluster.

Figure 8:
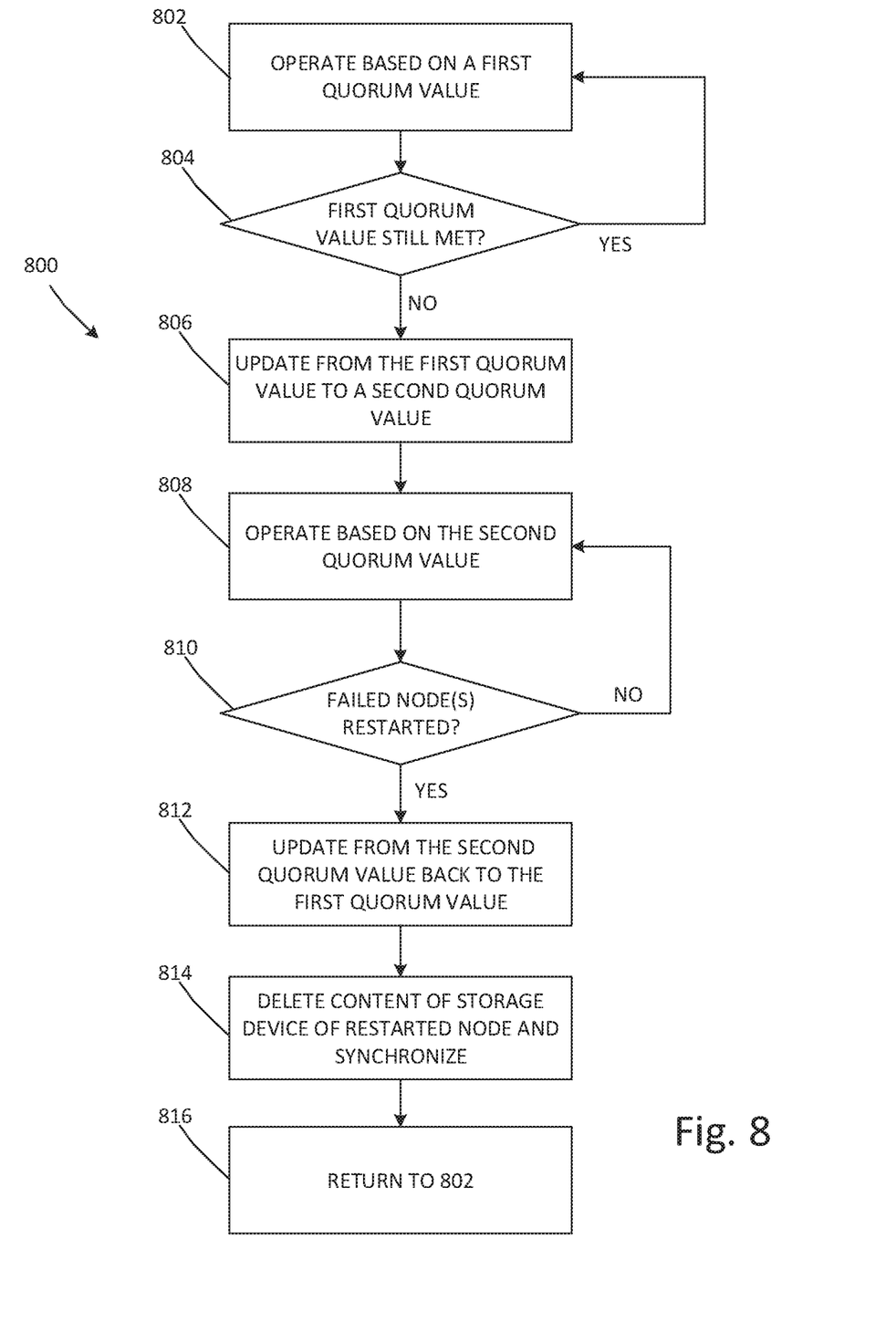
FIG. 8 is a flowchart of an example method to dynamically manage a quorum for the nodes of the cluster of FIG. 2.

FIG. 8 is a flowchart of an example method 800 to dynamically manage a quorum for the nodes of the cluster of FIG. 2. The method 800 can be implemented in the virtualized computing environment 100 in one embodiment. The example method 800 may include one or more operations, functions, or actions illustrated by one or more blocks, such as blocks 802 to 816. The various blocks of the method 800 and/or of any other process(es) described herein may be combined into fewer blocks, divided into additional blocks, supplemented with further blocks, and/or eliminated based upon the desired implementation. In one embodiment, the operations of the method 800 and/or of any other process(es) described herein may be performed in a pipelined sequential manner. In other embodiments, some operations may be performed out-of-order, in parallel, etc.

At least some of the operations in the method 800 may be performed by a first node (e.g., node1 202). In other embodiments, at least some of the method 800 may be performed by the management server 142 in cooperation with one or more nodes in a cluster. For the purposes of illustration and explanation, the method 800 will be described herein in the context of being performed by a first node that communicates with a second node (e.g., node2 204), such as previously described with reference to FIGS. 2-7.

The method 800 may begin at a block 802 ("OPERATE BASED ON A FIRST QUORUM VALUE"), wherein a cluster (such as the cluster 200 of FIG. 2) may have three nodes with quorum Q=2. The cluster 200 may operate at the block 802 with all of the nodes being enabled or with one of the nodes (e.g., node3 206) being in a failure state.

The operation of the cluster 200 at the block 802 may include, for example, a first node (e.g., node1 202) servicing requests, performing computational tasks, etc. A second node (e.g., node2 204) may also be operational at the block 802, and performing similar operations as the first node.

At a block 804 ("FIRST QUORUM VALUE STILL MET?"), the first node determines whether the quorum Q=2 is still met, by determining whether the second node is still active. For instance and as described above with respect to FIG. 4, node1 202 communicates with node2 204 to determine the operational status of node2 204. If the first node determines that the second node is still active ("YES" at the block 804), then the cluster 200 continues operating based on the first quorum value (Q=2) in accordance with the block 802.

If, at the block 804, the first node determines that the first quorum value is no longer met ("NO" at the block 804), due to the second node having entered a failure state, then the first node determines that the quorum value for the cluster should be updated. Accordingly at a block 806 ("UPDATE FROM THE FIRST QUORUM VALUE TO A SECOND QUORUM VALUE"), the first node updates the quorum from the first quorum value to a second quorum value that is less than the first quorum value (e.g., from Q=2 to Q=1). In some embodiments, the updating at the block 804 is a self-update operation performed by the first node.

Next at a block 808 ("OPERATE BASED ON THE SECOND QUORUM VALUE"), the first node operates (e.g., services requests, performs computational tasks, etc.) based on a quorum of Q=1. That is, the cluster is able to operate even with just one active node while the other nodes are disabled.

At a block 810 ("FAILED NODE(S) RESTARTED?"), the second node or any other failed node in the cluster may or may not be attempting to restart. If there is no restart ("NO" at the block 810), then the method 800 continues at the block 808 wherein the first node continues to operate based on the second quorum value (Q=1).

If, however, there is a restart of the failed node(s) ("YES" at the block 810), then the method 800 proceeds to the block 812 ("UPDATE FROM THE SECOND QUORUM VALUE BACK TO THE FIRST QUORUM VALUE"). At the block 812, the failed node is restarted with the first quorum value (Q=2), and the operational first node has its settings updated from the second quorum value (Q=1) back to the first quorum value (Q=2).

At a block 814 ("DELETE CONTENT OF STORAGE DEVICE OF RESTARTED NODE AND SYNCHRONIZE"), the stale content contained in the storage device of the restarted node is deleted. The deleted content is replaced by the up-to-date content from the first node, thereby synchronizing the content between the first node and the second node.

At a block 816 ("RETURN TO 802"), the method 800 returns to the block 802 in which the cluster operates according to the first quorum value (Q=2), and the process described above repeats.

Computing Device

The above examples can be implemented by hardware (including hardware logic circuitry), software or firmware or a combination thereof. The above examples may be implemented by any suitable computing device, computer system, etc. The computing device may include processor(s), memory unit(s) and physical NIC(s) that may communicate with each other via a communication bus, etc. The computing device may include a non-transitory computer-readable medium having stored thereon instructions or program code that, in response to execution by the processor, cause the processor to perform processes described herein with reference to FIG. 2 to FIG. 8.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term "processor" is to be interpreted broadly to include a processing unit, ASIC, logic unit, or programmable gate array etc.

Although examples of the present disclosure refer to "virtual machines," it should be understood that a virtual machine running within a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running on top of a host operating system without the need for a hypervisor or separate operating system; or implemented as an operating system level virtualization), virtual private servers, client computers, etc. The virtual machines may also be complete computation environments, containing virtual equivalents of the hardware and system software components of a physical computing system. Moreover, some embodiments may be implemented in other types of computing environments (which may not necessarily involve a virtualized computing environment), wherein it would be beneficial to dynamically manage a quorum as described herein.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood that each function and/or operation within such block diagrams, flowcharts, or examples can be implemented, individually and/or collectively, by a wide range of hardware, software, firmware, or any combination thereof.

Some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware are possible in light of this disclosure.

Software and/or other computer-readable instruction to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. The units in the device in the examples can be arranged in the device in the examples as described, or can be alternatively located in one or more devices different from that in the examples. The units in the examples described can be combined into one module or further divided into a plurality of sub-units.

We claim:

1. A method to dynamically manage a quorum in a quorum-based computing system that includes a cluster of nodes, the method comprising:
   determining, by a first node of the cluster of nodes, whether a first quorum value for the cluster is met, wherein the first quorum value represents a number of nodes in the cluster that are required to be in an active state to support tasks in the cluster;
   in response to a determination that the first quorum value is unmet due to a failure state of at least one other node in the cluster, updating the first quorum value to a second quorum value, wherein the second quorum value is less than the first quorum value;
   operating the first node according to the second quorum value to perform the tasks in the cluster; and
   in response to the at least one other node being transitioned from the failure state to the active state and receiving an instruction based on the first quorum value, which the at least one other node is configured with, from the at least one other node, updating, by the first node, from the second quorum value back to the first quorum value to enable the first node and the at least one other node to operate according to the first quorum value to perform the tasks in the cluster, wherein determining whether the first quorum value is met includes:
      determining, by the first node, whether the at least one other node responds to a first communication from the first node; and
      determining, by the first node, that the first quorum value is unmet in response to the at least one other node failing to timely or correctly responding with a second communication to indicate that the at least one other node is in the active state, and in response to a number of nodes in the cluster that are in the active state being less than the required number of active nodes in the cluster.

2. The method of claim 1, wherein the nodes comprise virtual machines in a virtual computing environment.

3. The method of claim 1, wherein determining whether the first quorum value is met further includes:
   determining, by the first node, that the first quorum value is met in response to the at least one other node timely and correctly responding with the second communication to indicate that the at least one other node is in the active state, and in response to a sum of the first node and the at least one other node meeting the required number of active nodes in the cluster.

4. The method of claim 1, further comprising:
   deleting, by the at least one other node, content in a storage device of the at least one other node that is being transitioned to the active state; and replacing, by the at least one other node, the deleted content with updated content from the first node, in a synchronization process.

5. The method of claim 1, wherein the first quorum value comprises one of: a simple majority number of nodes in the cluster, a supermajority number of nodes in the cluster or a specifically defined number of nodes in the cluster.

6. The method of claim 1, wherein the cluster includes three nodes, wherein the first quorum value corresponds to two nodes, and wherein the second quorum value corresponds to one node.

7. A non-transitory computer-readable medium having instructions stored thereon, which in response to execution by one or more processors, cause the one or more processors to perform or control performance of operations to dynamically manage a quorum in a quorum-based computing system that includes a cluster of nodes, the operations comprising:
  determine, by a first node of the cluster of nodes, whether a first quorum value for the cluster is met, wherein the first quorum value represents a number of nodes in the cluster that are required to be in an active state to support tasks in the cluster;
  in response to a determination that the first quorum value is unmet due to a failure state of at least one other node in the cluster, update the first quorum value to a second quorum value, wherein the second quorum value is less than the first quorum value;
  operate the first node according to the second quorum value to perform the tasks in the cluster; and
  in response to the at least one other node being transitioned from the failure state to the active state and receiving an instruction based on the first quorum value, which the at least one other node is configured with, from the at least one other node, update, by the first node, from the second quorum value back to the first quorum value to enable the first node and the at least one other node to operate according to the first quorum value to perform the tasks in the cluster, wherein the operations to determine whether the first quorum value is met comprise operations to:
    determine, by the first node, whether the at least one other node responds to a first communication from the first node; and
    determine, by the first node, that the first quorum value is unmet in response to the at least one other node failing to timely or correctly responding with a second communication to indicate that the at least one other node is in the active state, and in response to a number of nodes in the cluster that are in the active state being less than the required number of active nodes in the cluster.

8. The non-transitory computer-readable medium of claim 7, wherein the nodes comprise virtual machines in a virtual computing environment.

9. The non-transitory computer-readable medium of claim 7, wherein the operations to determine whether the first quorum value is met further comprise operations to:
  determine, by the first node, that the first quorum value is met in response to the at least one other node timely and correctly responding with the second communication to indicate that the at least one other node is in the active state, and in response to a sum of the first node and the at least one other node meeting the required number of active nodes in the cluster.

10. The non-transitory computer-readable medium of claim 7, wherein the operations further comprise:

delete, by the at least one other node, content in a storage device of the at least one other node that is being transitioned to the active state; and
replace, by the at least one other node, the deleted content with updated content from the first node, in a synchronization process.

11. The non-transitory computer-readable medium of claim 7, wherein the first quorum value comprises one of: a simple majority number of nodes in the cluster, a supermajority number of nodes in the cluster or a specifically defined number of nodes in the cluster.

12. The non-transitory computer-readable medium of claim 7, wherein the cluster includes three nodes, wherein the first quorum value corresponds to two nodes, and wherein the second quorum value corresponds to one node.

13. A first node in a cluster of nodes of a quorum-based computing system, the first node comprising:
  a processor; and
  a non-transitory computer-readable medium coupled to the processor and having instructions stored thereon, which in response to execution the processor, cause the processor to perform or control performance of operations to dynamically manage a quorum in the quorum-based computing system, wherein the operations include:
    determine whether a first quorum value for the cluster is met, wherein the first quorum value represents a number of nodes in the cluster that are required to be in an active state to support tasks in the cluster;
    in response to a determination that the first quorum value is unmet due to a failure state of at least one other node in the cluster, update the first quorum value to a second quorum value, wherein the second quorum value is less than the first quorum value;
    operate the first node according to the second quorum value to perform the tasks in the cluster; and
    in response to the at least one other node being transitioned from the failure state to the active state and receiving an instruction based on the first quorum value, which the at least one other node is configured with, from the at least one other node, update, by the first node, from the second quorum value back to the first quorum value to enable the first node and the at least one other node to operate according to the first quorum value to perform the tasks in the cluster, wherein the operations to determine whether the first quorum value is met comprise operations to:
      determine, by the first node, whether the at least one other node responds to a first communication from the first node; and
      determine, by the first node, that the first quorum value is unmet in response to the at least one other node failing to timely or correctly responding with a second communication to indicate that the at least one other node is in the active state, and in response to a number of nodes in the cluster that are in the active state being less than the required number of active nodes in the cluster.

14. The first node of claim 13, wherein the nodes comprise virtual machines in a virtual computing environment.

15. The first node of claim 13, wherein the operations to determine whether the first quorum value is met further comprise operations to:
  determine, by the first node, that the first quorum value is met in response to the at least one other node timely and correctly responding with the second communication to indicate that the at least one other node is in the active state, and in response to a sum of the first node and the at least one other node meeting the required number of active nodes in the cluster.

16. The first node of claim 13, wherein the first quorum value comprises one of: a simple majority number of nodes in the cluster, a supermajority number of nodes in the cluster or a specifically defined number of nodes in the cluster.

17. The first node of claim 13, wherein the cluster includes three nodes, wherein the first quorum value corresponds to two nodes, and wherein the second quorum value corresponds to one node.

* * * * *